2,875,240

PREPARATION OF ALKENYL ESTERS OF HALOGENATED CARBOXYLIC ACIDS

John B. Braunwarth, Crystal Lake, and Gifford W. Crosby, River Forest, Ill., assignors to The Pure Oil Company, Chicago, Ill., a corporation of Ohio No Drawing. Application November 19, 1956
Serial No. 622,794

7 Claims. (Cl. 260—487)

This invention relates to the preparation of esters and alcohols. It is especially directed to a novel esterification reaction and, if desired, the subsequent hydrolysis of the ester to prepare the corresponding alcohol.

The importance of esters as plasticizers and chemical intermediates has increased considerably in recent years. Although the classical esterification reaction involves the reaction between an alcohol and a carboxylic acid, there is no single method which applies equally well for all esters. Accordingy, there are a number of variations in reaction conditions under which esters can be produced. A probem rises in preparing esters containing unsaturated carbon-to-carbon linkages, and which are monomeric molecules. The prior are has considered the preparation of alkenyl esters. For example, in U. S. Patent 2,198,046, it is taught that esters can be prepared by reacting a hydrocarbon containing at least one olefinic double bond with a carboxylic acid at an elevated temperature, under superatmospheric pressure, in the presence of a $BF_3$ catalyst. This reaction is also employed in the synthesis of several specific polymeric esters. Polybutenyl esters can be prepared, according to U. S. Patent 2,533,938, from butadiene and certain carboxylic acids employing perchloric acid as a catalyst. Polypentenyl esters can also be prepared in a similar manner from isoprene (cf. U. S. Patent 2,460,291). In addition to the polymeric esters, small yields of monomeric reaction products were obtained.

It is therefore the primary object of this invention to provide an uncatalyzed esterification reaction for the production of unpolymerized esters employing an unsaturated hydrocarbon as a reactant. Another object of this invention is the production of monomeric, unsaturated esters and alcohols employing a liquid phase, non-catalyzed reaction. A further object of this invention is the synthesis of unsaturated, monomeric esters prepared by reacting a polyunsaturated hydrocarbon and a halogenated organic acid in the liquid phase, in the absence of a catalyst. These and other objects will be made more apparent from the following detailed description of this invention.

According to this invention, it has been found that monomeric, alkenyl esters can be prepared by reacting, preferably at atmospheric pressure and a temperature of 20° to 100° C., a diene with a halogenated organic acid in the liquid phase, with no added solvent or catalyst. The dienes which are employed in this reaction, are the aliphatic and alicyclic conjugated dienes, having 4–10 carbon atoms per molecule, which are unsubstituted or contain substituent nonfunctional groups which will not interfere with the reaction between the diene and the halogenated acid. Specific examples include but are not limited to the following dienes: 1,3-butadiene, 1,3-pentadiene, isoprene, 1,3-cyclohexadiene, 3-methylenecyclohxene, 1-phenyl-1,3-butadiene.

The halogenated, organic acids which are utilized are the alpha-halogenated monocarboxylic alkanoic acids having two to eight carbon atoms per molecule or mixtures thereof. Specific examples include trichloroacetic acid, dichloroacetic acid, chloroacetic acid, $\alpha$-bromopropionic acid, $\alpha,\alpha$-dichlorobutyric acid.

The products of the reaction of conjugated dienes with haloacids have configurations in accordance with the Markownikoff rule of addition to unsaturates. For example, addition to 1,3 dienes occurs with hydrogen adding to $C_1$ and carboxylate adding to $C_2$ or $C_4$ to give a mixture of isomers.

A principal feature of the instant invention is the ease of reaction and simplicity in the operating conditions employed. Because liquid $\alpha$-haloacids readily absorb gaseous dienes or dissolve sufficient liquid diene to react at a reasonable rate, and because dilution is not needed to control the reaction rate, the reaction can be carried out with no added solvent. The subject reaction can be carried out at temperatures of 20° to 100° C. and atmospheric pressure. Although these operating conditions are preferred, temperatures as low as 0° C. or as high as 150° C. are effective. Also, subatmospheric or superatmospheric pressures of 5 to 700 p. s. i. a. can be employed. The reaction theoretically employs equimolar portions of reactants. It is preferred, however, that the diene be present in excess and that unreacted diene be recycled in the case of a flow reactor or recovered for reuse in a batch process. Preferred ratios of diene to acid fall within the range 1 to 4 moles of diene per mole of acids, and preferred contact times include those up to 4 hr.

The following specific embodiment illustrates, in a non-limiting manner, the essence of this invention:

Trichloroacetic acid (200 gm., or 1.2 moles) was melted and butadiene was passed through the liquid at a rate of 1.8 liters/hr. for 12 hours. A temperature of 40° C. was maintained during the latter part of the reaction. The weight increase in the reaction mixture was 19 gm. The reaction mixture was diluted with 75 cc. of carbon tetrachloride and washed with water to remove unreacted trichloroacetic acid. The ester solution was dried over $CaSO_4$ and distilled to remove carbon tetrachloride. The crude ester was distilled at 23 mm. pressure using a 12-inch Vigreux column. Distillation was discontinued when decomposition became apparent. Results from this initial distillation were as follows:

| | |
|---|---|
| Dist. charge | 78.3 gm. |
| Distillate, 84°–95° C | 52.6 gm., 66%. |
| Residue | 18.0 gm., 24%. |
| Loss | 7.7 gm., 10%. |

Redistillation of the crude ester distillate through a 3 foot Todd column packed with a Monel spiral and rated at approximately 40 plates gave a methylvinylcarbinyl trichloroacetate fraction in 79 wt. percent yield having a boiling point, 74.5–76.5° C. at 12 mm., and a refractive index, $n_D^{20}$ of 1.4585. The calculated molecular weight for $C_6H_7Cl_3O_2$ is 217. The molecular weight of the product was determined to be 210.

The ester was saponified with KOH and an alcohol product was isolated with a boiling point range of 84–93° C. at 1 atmosphere. This product contained water, and the alcohol was salted out with potassium carbonate. On redistillation, the mixed butenyl alcohols boiled at 84°–120° C. Analysis of the alcohol fraction showed that the product had a bromine number of 213 which compared closely with the bromine number of $C_4H_8O$ which was calculated to be 222.

The properties of this alcohol fraction indicate that it is a mixture of $C_4$ unsaturated alcohols, isomerization having occurred during the process of hydrolysis of the narrow-boiling-range ester. Possible isomers include cis- and trans-2-butene-1-ol and 3-butene-2-ol.

In a similar manner, butenyl chloroacetate was prepared from chloroacetic acid and butadiene at 65° C. The crude ester distilled at 70–104° C. at 15 min. pressure, and again only minor amounts of polymeric material were produced. In contradistinction, no butenyl acetates were formed under the same conditions from acetic acid and butadiene.

It is to be noted that, in the foregoing example the butenyl ester prepared in accordance with this invention was hydrolyzed to prepare butenyl alcohol. Alkenyl alcohols, such as 2-butene-1-ol and 3-butene-2-ol, are not readily produced from butadiene by ordinary techniques such as sulfuric ester formation or acid-catalyzed hydration as practiced with mono-olefins. Polymerization of butadiene occurs under these conditions. The above alcohols are therefore prepared by other syntheses such as the reduction of crotonaldehyde or a methyl Grignard addition to acrolein. The technique of hydrolyzing the alkenyl esters prepared in accordance with this invention affords a practical alternative synthesis. Although hydrolysis or saponification with a caustic alkali was employed in the illustrative example, other hydrolyzing agents such as water, acids, etc., can be utilized. Because the details of hydrolysis or saponification are well known to those skilled in this art, an elaborate discussion of appropriate techniques is not essential herein. For details, reference is made to such standard works as Unit Processes in Organic Synthesis, Groggins, McGraw-Hill, 4th ed., 1952, as well as Organic Syntheses, Coll. vols. I and II, John Wiley and Sons, Inc.; Industrial and Engineering Chemistry, annual review of Unit Processes in Chemical Engineering.

It is evident that modifications of the illustrated embodiment can be made without departing from the scope of this invention. Suitable apparatus for carrying out the reactions of this invention includes batch reactors operated at atmospheric or superatmospheric pressure, baffled or packed towers for concurrent contacting of reactants coupled with a stripping tower for recovery and recirculation of unchanged hydrocarbon. Recycling of unreacted diene effectively raises the conversion to ester.

Separation of the ester from by-products and from unreacted charge materials may be effected by a combination of extraction and distillation steps. Solvents such as chloroform or carbon tetrachloride may be used to dissolve the product ester and unchanged diene and water may also be added to facilitate separation of the free acid phase. The product phase is then distilled to recover unchanged diene, solvent and ester fractions.

If the alkenyl alcohol is desired as the end product, the crude reaction mixture produced by the reaction between a diene and a halogenated acid can be hydrolyzed in situ with the subsequent recovery of the alcohol by "salting out" techniques or other suitable purification methods such as fractional distillation.

Accordingly, what is claimed as this invention is:

1. A method for the non-catalyzed preparation of a monomeric alkenyl ester which comprises reacting an unsaturated olefin selected from the group consisting of aliphatic and alicyclic conjugated dienes having 4–10 carbon atoms per molecule with an acid of the group consisting of $C_2$–$C_8$ monocarboxylic alkanoic acids having at least one halogen of the group consisting of chlorine and bromine in the alpha position, at a temperature of 0°–150° C. in a catalyst-free reaction zone to produce a monomeric alkenyl ester.

2. A method in accordance with claim 1 in which 1–4 mols of the olefin are reacted with 1 mol of the halogenated acid.

3. A method in accordance with claim 1 in which the reaction is carried out at a temperature of 20°–100° C.

4. A method in accordance with claim 3 in which the reaction is carried out at atmospheric pressure.

5. A method for the non-catalyzed preparation of a monomeric alkenyl ester which comprises preparing a molten mass of an acid of the group consisting of $C_2$–$C_8$ monocarboxylic alkanoic acids having at least one halogen of the group consisting of chlorine and bromine in the alpha position, in a catalyst-free reaction zone, passing a gaseous stream of an unsaturated olefin selected from the groups consisting of aliphatic and alicyclic conjugated dienes having 4–10 carbon atoms per molecule, through the molten acid at a temperature of about 20°–100° C., and recovering the monomeric alkenyl ester thus produced.

6. A method in accordance with claim 5 in which said olefin is an aliphatic conjugated diene.

7. A method in accordance with claim 6 in which the acid used is trichloroacetic acid.

References Cited in the file of this patent

UNITED STATES PATENTS

| | | |
|---|---|---|
| 1,939,384 | Buc | Dec. 12, 1933 |
| 2,533,938 | Jenner | Dec. 12, 1950 |

FOREIGN PATENTS

| | | |
|---|---|---|
| 1,111,222 | France | Oct. 26, 1955 |